Jan. 31, 1950   E. R. TRIST   2,495,788
ELECTRIC HEATER

Filed March 25, 1946   3 Sheets-Sheet 1

INVENTOR.
Edward R. Trist
BY A. D. Adams
Attorney

Jan. 31, 1950  E. R. TRIST  2,495,788
ELECTRIC HEATER
Filed March 25, 1946  3 Sheets-Sheet 2
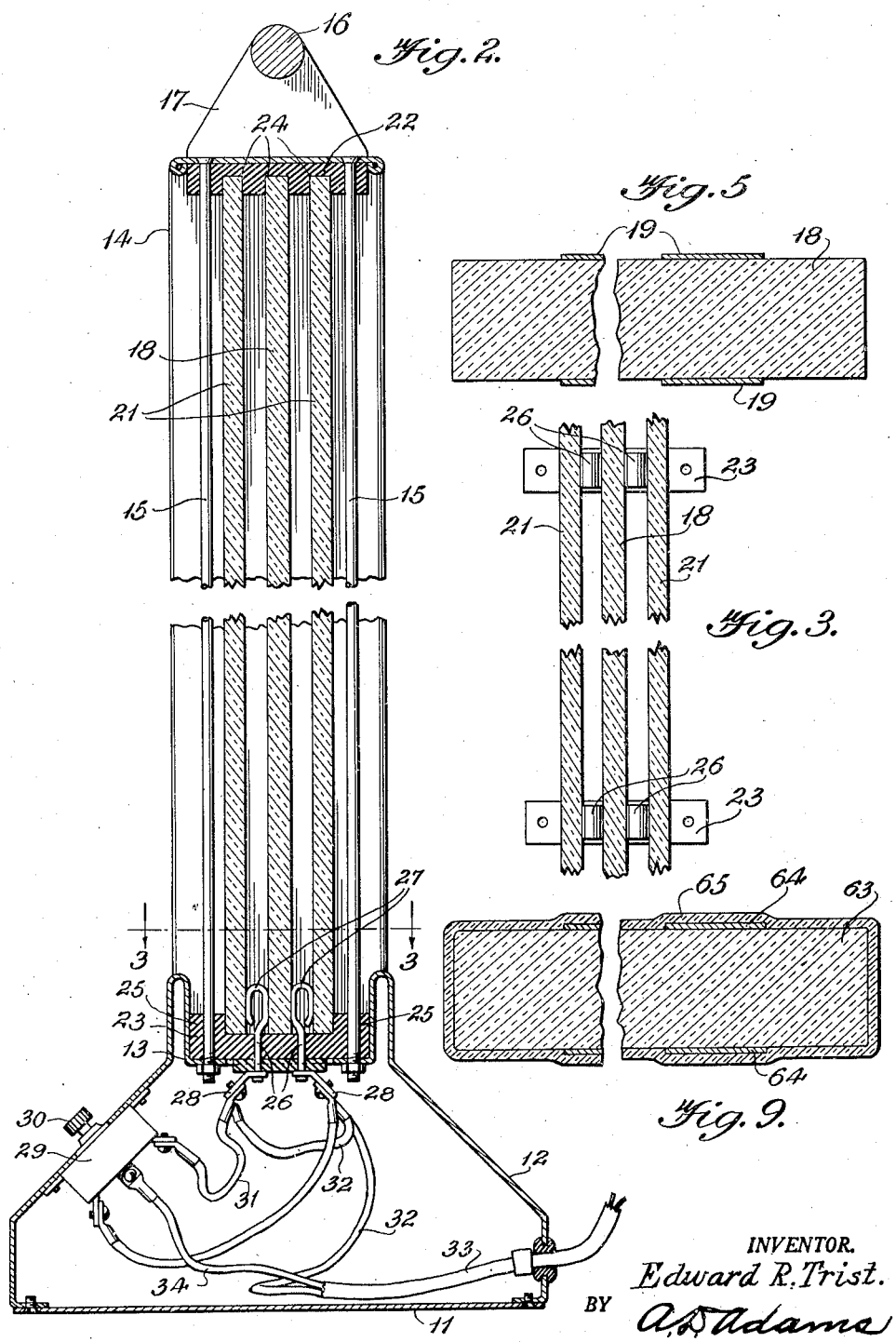
INVENTOR.
Edward R. Trist.
BY A. D. Adams
Attorney Jan. 31, 1950 — E. R. TRIST — 2,495,788
ELECTRIC HEATER
Filed March 25, 1946 — 3 Sheets-Sheet 3
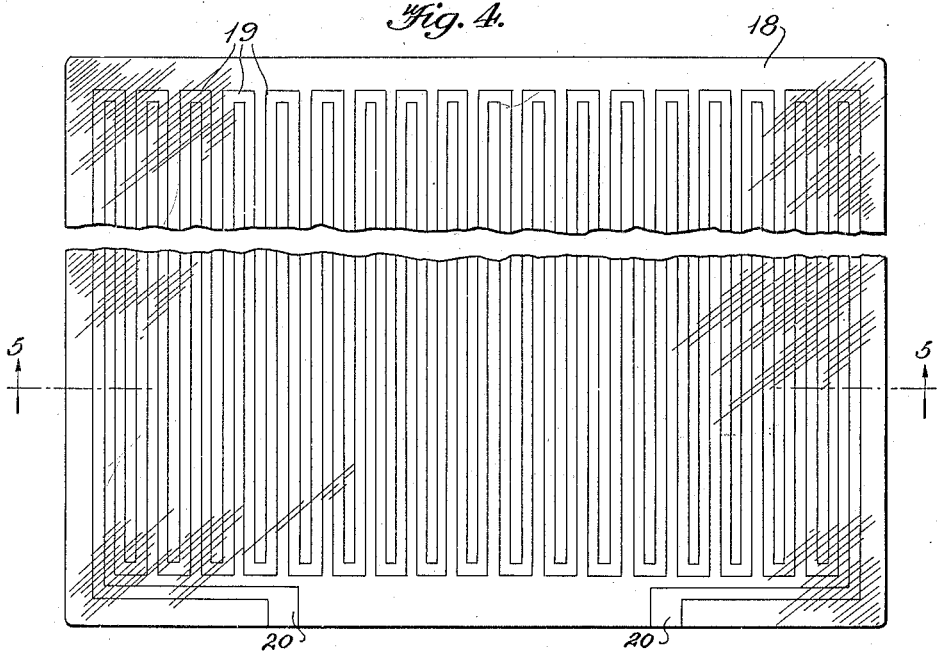
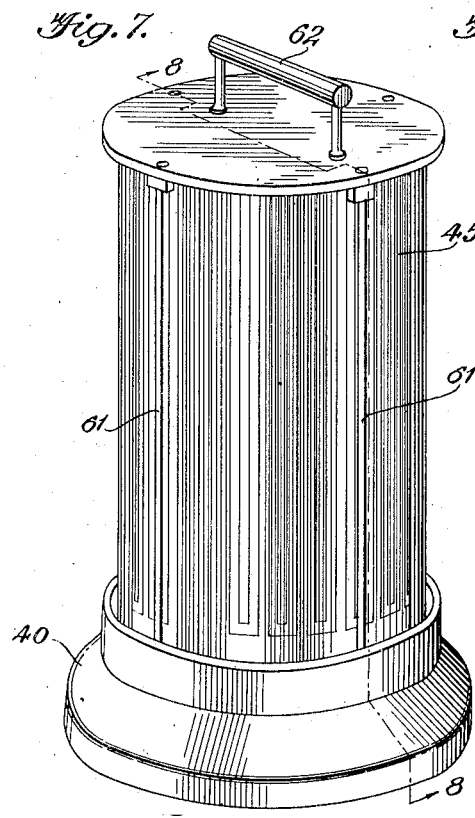
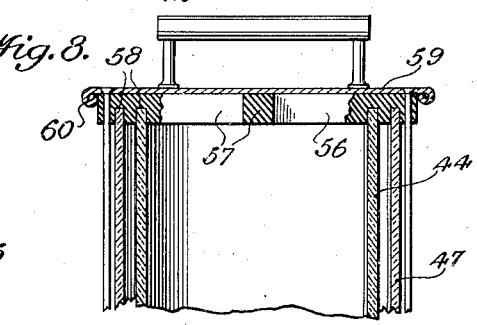
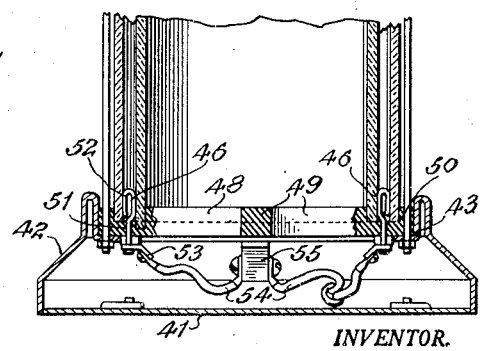
INVENTOR.
Edward R. Trist.
BY A. D. Adams
Attorney.

Patented Jan. 31, 1950

2,495,788

UNITED STATES PATENT OFFICE 2,495,788

ELECTRIC HEATER

Edward Robert Trist, Washington, D. C.

Application March 25, 1946, Serial No. 656,792

2 Claims. (Cl. 219—34)

This invention pertains to heating devices and the method of making them and has more particular reference to electric radiant heaters of the type wherein the heat source consists of infra-red heat rays.

Prior heating devices of this type usually consist of a flat plate of tempered glass having a ribbon-like strip of metal fused thereon, which, when charged with electricity, emits infra-red heat rays.

These prior devices, while efficient and practical, all have certain defects and limitations. The carrier member or plate upon which the metal is fused, being made of tempered glass, cannot be formed in curved or other non-planar shapes, as tempered glass can only be made in flat sheets. In addition, there are always possibilities that internal stresses inherent in tempered glass may cause small particles or slivers to fly off from the surface of the glass.

One object of the present invention is to provide a heating device and the method of making the same, having a carrier member or plate formed to any desired shape and free from internal stresses tending to cause the material to splinter.

Another object of the invention is to provide a method of firmly and securely attaching the heating element to the carrier plate.

Another object of the invention is to provide a heating device having a protective screen for the heating element which does not reduce the efficiency thereof.

A further object of the invention is to provide a heating device which is simple in construction and safe, efficient and economical in operation.

Other objects and advantages of the invention will appear in the specification, when considered in connection with the accompanying drawings, in which:

Fig. 2 is a vertical sectional view taken on the line 2—2 of Fig. 1, looking in the direction of the arrows;

Fig. 3 is a horizontal sectional view taken on the line 3—3 of Fig. 2, looking in the direction of the arrows;

Fig. 4 is a side view of the carrier member shown in Fig. 1, having a portion thereof broken away;

Fig. 5 is an enlarged cross sectional view of the flat carrier member shown in Fig. 4, having a portion thereof broken away;

Fig. 7 is a perspective view of a heater having a tubular carrier member;

Fig. 8 is a vertical sectional view taken on the line 8—8 of Fig. 7, looking in the direction of the arrows; and Fig. 9 is a view similar to that of Fig. 5, but showing a protective coating of lacquer applied to the carrier member.

Figure 1:
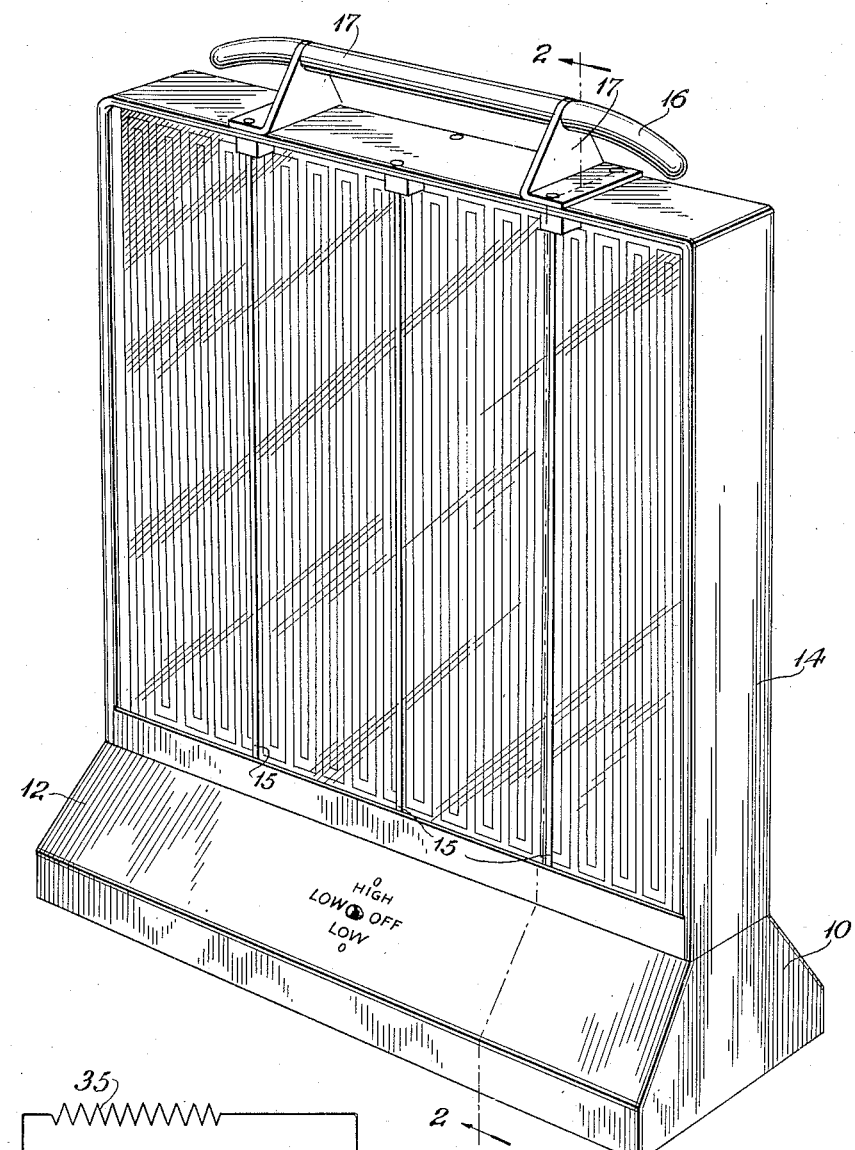
Fig. 1 is a perspective view of a heater having a flat carrier member.

In Figs. 1–6 of the drawings, there is shown an electric radiant heater having a base member 10, preferably made of stainless sheet steel and comprising a flat bottom plate 11 having a cover plate 12, pressed into the configuration shown in cross section in Fig. 2, secured thereto as by bolting or welding. The top of the cover plate is formed with a flat bottom trough 13 extending longitudinally thereof.

A U-shaped frame 14 is mounted on the base 10 and secured thereto as by means of a plurality of spaced pairs of spaced bolts 15.

A handle 16, made of insulation material, is attached to the top of the U-shaped frame by means of a pair of L-shaped bracket members 17, preferably secured thereto by two of the pairs of bolts 15, as clearly shown in Fig. 1.

The U-shaped frame 14, the bolts 15, and the bracket members 17, are preferably made of aluminum. The frame 14 and the bolts 15 form a safety grill in which is mounted the heating assembly. The heating assembly comprises a flat rectangular carrier member 18 having heating elements 19 mounted on both sides thereof. The heating elements 19 are of identical construction and each consists of a continuous meandrian ribbon-like strip of electrical conducting material having its terminal ends 20 of enlarged width, as shown in Fig. 4, for a purpose hereinafter to be described, and a pair of flat rectangular translucent glass plates 21 of the same size as the carrier member.

The carrier member 18 and the glass plates 21 are mounted in the trough 13 of the base and are held in spaced-apart relationship by two or more top separator members 22 and two or more bottom separator members 23. These separator members are preferably made of bonded fiber insulation material.

The top separator members are bolted to the underside of the U-shaped frame, preferably by pairs of the elongated bolts 15, as clearly shown in Fig. 2, and each member is of flat rectangular shape and has spaced-apart recesses 24 formed therein for the reception of the carrier member 18 and the two glass plates 21.

The bottom separator members 23 are fitted in the trough 13 of the base and secured therein by bolts, preferably by pairs of the bolts 15, as clearly seen in Fig. 2.

Each bottom separator member is of rectangular shape and has upstanding flanges 25 formed on its ends. A pair of copper coated steel strips 26 extend through the separator member intermediate of the flanges. The ends of the steel strips extending above the separator member are bent outwardly and downwardly to form substantially oval extensions 27. The ends of the steel strips extending downwardly from the separator member, are provided with terminal connectors 28. The oval-shaped extensions 27 of the steel strips, together with the upwardly extending flange 25 formed on the ends of the separators, provide sockets for the reception of the bottom edges of carrier member 18 and the two glass plates 21, all as best seen in Fig. 2. The oval-shaped ends 27 of the copper coated steel strips, due to their resiliency, are held in firm contact with the enlarged terminal ends 20 of the heating elements 19 to provide a good electrical connection therewith and to prevent sidewise movement of the carrier member.

A selective switch 29 is mounted on the inside of the base member and has a knob 30 extending through an opening therein. The right hand pair of terminal connectors 28, as viewed in Fig. 1, are connected to the selective switch by wires 31. The left hand pair of terminal connectors 28 are connected to conductor 32 in the lead-in wire 33. The other conductor 34 of the lead-in wire 33 is connected to the selective switch 29.

Figure 6:
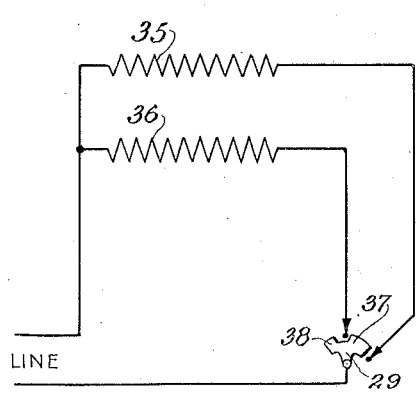
Fig. 6 is a diagrammatic view of the electric circuit employed in the heater shown in Fig. 1.

The electrical circuit employed is shown diagrammatically in Fig. 6, wherein the heating elements are shown as resistances 35 and 36, and the selective switch is shown as a rotatable Y-shaped member having a pair of spaced contact arms 37 and 38. Obviously, any suitable selective switch may be employed for this purpose.

The contact element 37 of the selective switch may be turned to the right to permit current to flow through the resistance 35, or to the left to permit current to flow through the resistance 36. The selective switch may be turned even further to the right to bring contact element 38 into contact with the terminal of resistance 36 at the same time as contact element 37 is in contact with the terminal of resistance 35, thus connecting the resistances 35 and 36 in parallel. Indicia may be placed around the knob 30, on the outside of the base, as shown in Fig. 1, to indicate the selective positions to which the switch may be turned.

In Figs. 7 and 8 there is shown another embodiment of a heater constructed in accordance with my invention and having a tubular shaped carrier member. There is shown a heater having a base member 40, preferably made of stainless sheet steel and comprising a flat disc-shaped bottom plate 41 having a cover plate 42, pressed into the configuration shown in cross section in Fig. 8, secured thereto as by bolting or welding. The top of the cover plate is formed with a circular recess 43 in which is mounted the heating assembly.

The heating assembly comprises a tubular carrier member 44 having a heating element 45 mounted on its outer surface, consisting of a continuous meandrian ribbon-like strip of electrical conducting material having its terminal ends 46 of enlarged width for a purpose hereinafter to be described, and a tubular protecting screen 47 of translucent material such as glass or Plexiglas having a diameter greater than the diameter of the carrier member. Fig. 4 may be considered as a development view of the tubular carrier member, wherein the enlarged terminal ends of the heating element 19 would correspond to the enlarged terminal ends 46 of the heating element of the tubular carrier member.

The carrier member and the tubular screen are mounted in the recess in the top of the cover plate with the carrier member encased within the screen and are held in spaced apart relationship by means of a bottom separator member 48. The separator member 48 is preferably made of pressed bonded fiber insulation material and formed in the shape of a cross with four integrally formed radially extending arms 49, each having an arcuate recess 50 formed therein near its outer end. A copper coated steel strip 51 is located in each recess intermediate of the side walls thereof and extends through the separator member. The ends of the steel strips 51 extending above the separator are bent outwardly and downwardly into substantial oval shaped extensions 52. The ends of the steel strips extending below the separator may be provided with terminal connectors 53. In the embodiment shown, where only one heating element is mounted on the carrier, two such terminal connectors 53 are used and they are connected, by means of wires 54, to an electrical connection or jack box 55 adapted to be connected to a source of electric current.

The oval shaped extensions 52 of the steel strips, together with the side walls of the recesses 50, provide sockets for the reception of the bottom edges of carrier member 44 and the tubular screen 47, all as clearly shown in Fig. 8. The oval shaped ends 52 of the steel strip, due to their resiliency, are held in firm contact with the enlarged terminal ends 46 of the heating element 45 to provide a good electrical connection therewith and to prevent rotary movement of the carrier member. The upper ends of the carrier member and the tubular screen are held in spaced apart relationship by means of a top separator 56.

The top separator member 56 is preferably made of pressed bonded fiber insulation material and is made in the shape of a cross with four integrally formed radially extending arms 57. The outer end of each arm is provided with a pair of spaced apart arcuate recesses 58 for the reception of the carrier member and the tubular screen, as clearly shown in Fig. 8.

The heater is provided with a flat, disc-shaped cover plate 59, preferably made of aluminum and provided with a downwardly and inwardly turned peripheral flange 60. The cover plate and the top and bottom separator members are held in position by means of four safety grill bolts 61, which extend through the cover plate, the outer edges of the arms of the top and bottom separators, and are bolted to the base, as clearly shown in Fig. 8. The heater is provided with a handle 62 attached to the cover plate.

While there have been shown two embodiments of an electric radiant heater having a heating assembly made in accordance with the present invention, obviously, heaters and heating devices adapted for various purposes and constructed in various forms, may be made in accordance with the principles of the present invention.

In the embodiments of the invention as above described, or in other embodiments thereof, the carrier member may be made of any ceramic or plastic material, or material of a mineral composition of a cementitious nature, such as cement asbestos, having good heat resistant, insulating and dielectric qualities and having the characteristic of being capable of being made in any desired shape free from internal stresses and having flat, curved or non-planar surfaces. The preferred material is a mineral composition of a cementitious nature, such as cement asbestos. This material may be formed by pressure moulding to any desired shape having a flat, curved or non-planar surface and, when so formed, is free from internal stresses tending to cause the material to splinter. This material is capable of absorbing 1200° F. of steady or intermittent heat without damage or disintegration and has excellent insulating and dielectric qualities. The heating element may be made of any metallic material. The preferred material is an aluminum manganese alloy made by the Aluminum Company of America under their trade specification (S 3) (1.25 Mang.). The A. S. T. M. specification for this alloy is Spec. B-79-38-T.

In making the heating device, the carrier member is first formed by pressure moulding to the desired shape having a flat, curved, or other non-planar surface or surfaces upon which the heating element is to be mounted. Then the carrier member is heated to open the pores on the surface of the member. A temperature of 600° F. has been found sufficient for this purpose when Electrobestos is used. Next, fused aluminum alloy is applied to the surface or surfaces, while heated, in a continuous ribbon-like strip in the form of a maze, grill, spiral, or any other desired design, the primary consideration being to provide the maximum amount of surface coverage and, at the same time, insure sufficient insulation between the bars or reaches of the strip in relation to each other. The preferred method of applying the melted alloy is by spraying. The fused-on metal enters the pores of the carrier and firmly and securely anchors the strip to the surface of the carrier. The fused metal is sprayed on the carrier surface to form a ribbon-like flat strip of even thickness and width, the thickness being one to three thousandths of an inch and the width being one-eighth to three-eighths of an inch, these dimensions being in accordance with the required wattage the heating device is intended to carry.

There will be no danger of the fused alloy strip disintegrating from the carrier member, as the relative expansion of the two materials is insignificant at the temperatures produced by the heating device when in operation.

When the carrier member is made of material having large pores, the step of heating the carrier member before fusing the metal strip thereon may be omitted. Certain other types of material possessing a density having no apparent porosity, must preferably have a track prepared thereon, onto which the fused metal strip is sprayed. Such track may be prepared by running a roweling wheel of the desired width of track over the surface of the carrier member to form multitudinous pores or openings therein.

The heating element is provided with a protective screen of heat resistant translucent material. In the embodiment shown in Figs. 1 to 9, sheets of translucent material such as glass or Plexiglas are employed for this purpose. However, the surface of the carrier member, after the heating element has been fused thereon, may be coated, as by spraying, with a thick coating of heat resistant, translucent lacquer. In Fig. 9, there is shown a carrier member 63, having a heating element 64 on its front and back surfaces, encased in a coating 65 of translucent lacquer.

Obviously, certain further changes may be made in the above construction and different embodiments of the invention may be made without departing from the scope thereof. It is intended that all matter contained in the foregoing description, or shown in the accompanying drawings, shall be interpreted as illustrative and not in a limiting sense.

What is claimed is:

1. An electric radiant heater comprising a base; an inverted U-shaped frame mounted thereon; a heating assembly including a pair of outer screening members of translucent material and an inner carrier member of heat resistant, non-conducting material having a continuous meandrian ribbon-like strip of conducting material fused on its front and back surfaces; a pair of non-conducting top separator members attached to the underside of the top of said frame; a pair of non-conducting bottom separator members attached to the top of said base; said heating assembly being mounted on said base within said frame and with said screening members and said carrier member held in spaced apart relationship by said separator members; a spaced pair of conductors mounted on each of said bottom separator members with each conductor engaging one of the terminal ends of said strips; and a selective switch adapted to permit electric current to flow through either one or both of said strips.

2. An electric radiant heater as set forth in claim 1, wherein said carrier member is formed of a cementitious asbestos material and wherein said ribbon-like strip of conducting material is formed of aluminum alloy.

EDWARD ROBERT TRIST.

REFERENCES CITED

The following references are of record in the file of this patent:

UNITED STATES PATENTS

| Number | Name | Date |
| --- | --- | --- |
| 998,269 | Trepreau | July 18, 1911 |
| 1,693,133 | Biederman | Nov. 27, 1928 |
| 1,985,166 | Haroldson | Dec. 18, 1934 |
| 2,119,680 | Long | June 7, 1938 |
| 2,321,587 | Davie et al. | June 15, 1943 |

FOREIGN PATENTS

| Number | Country | Date |
| --- | --- | --- |
| 503,203 | Great Britain | Mar. 30, 1939 |